United States Patent
Frankkila et al.

(10) Patent No.: US 8,121,115 B2
(45) Date of Patent: Feb. 21, 2012

(54) COMPRESSED DELAY PACKET TRANSMISSION SCHEDULING

(75) Inventors: Tomas Frankkila, Luleå (SE); Marten Ericson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 536 days.

(21) Appl. No.: 11/504,779

(22) Filed: Aug. 16, 2006

(65) Prior Publication Data
US 2008/0008203 A1    Jan. 10, 2008

Related U.S. Application Data (60) Provisional application No. 60/819,373, filed on Jul. 10, 2006.

(51) Int. Cl.
*H04L 12/56* (2006.01)
(52) U.S. Cl. .......................... 370/389; 370/412; 370/516
(58) Field of Classification Search .................. None
See application file for complete search history.

(56) References Cited

U.S. PATENT DOCUMENTS

| | | | | |
|---|---|---|---|---|
| 5,757,771 | A * | 5/1998 | Li et al. | 370/235 |
| 2005/0063328 | A1* | 3/2005 | Dunagan et al. | 370/324 |
| 2005/0094622 | A1* | 5/2005 | Mallila | 370/352 |
| 2007/0025264 | A1* | 2/2007 | Cheng et al. | 370/252 |
| 2007/0053290 | A1* | 3/2007 | Michels | 370/230 |

OTHER PUBLICATIONS

Lim, Youngho, Analysis of a Delay-Dependent Priority Discipline in an Integrated Multiclass Traffic Fast Packet Switch, May 1990, IEEE, pp. 659-665.*
English Translation of Chinese official action, Dec. 13, 2011, in Chinese Application No. 200780026040.1.

* cited by examiner

*Primary Examiner* — Nittaya Juntima
*Assistant Examiner* — Tito Pham
(74) *Attorney, Agent, or Firm* — Nixon & Vanderhye P.C.

(57) ABSTRACT

A packet scheduler reduces or "compresses" the packet transmission delay jitter or delay range where packets experience little or no scheduling delay before transmission. As a result, the number of packets that experience little or no delay is reduced. A preferred example way of compressing the packet transmission delay jitter is to reduce the transmission priority of low delay packets. Compressing the delay jitter is particularly desirable for services like VoIP that require low packet transmission delay jitter.

28 Claims, 5 Drawing Sheets

COMPRESSED DELAY PACKET TRANSMISSION SCHEDULING

RELATED APPLICATIONS

This application claims priority from U.S. provisional patent application 60/819,373 entitled, "Compressed Delay Packet Transmission Scheduling," filed on Jul. 10, 2006, the contents of which are incorporated here by reference.

TECHNICAL FIELD

The technical field relates to mobile radio communications, and more particularly, to scheduling of IP packets over a shared radio channel such as the high speed-downlink shared channel (HS-DSCH) for wideband code division multiple access (WCDMA) cellular communications systems.

BACKGROUND

In mobile radio communications, a variety of different type channels may be used to convey different types of information. For example, channels may be defined as control/signaling channels or traffic channels, or they may be characterized as dedicated or common/shared channels. In third generation, WCDMA cellular communications systems, the physical channels are broken down in many ways. For example, some channels are dedicated while others are shared. Two example dedicated channels are a dedicated physical data channel and a dedicated physical control channel. Two example shared channels are the high speed-downlink shared channel (HS-DSCH) mentioned in the technical field and a physical common packet channel. Shared channels require some type of sharing protocol to allow users to constructively communicate information. To that end, one or more scheduling entities regulate access to the shared channel in accordance with a scheduling protocol or algorithm.

A high speed shared channel scheduler multiplexes user information for transmission over the entire HS-DSCH bandwidth in time-multiplexed intervals called time transmission intervals (TTIs). For example, during a first TTI, a transmission over the HS-DSCH from a first user to a mobile terminal may use all of the bandwidth allotted to the HS-DSCH. For HS-DSCH, the base station is the transmitter and the user equipment (UE) is the receiver. Scheduling can also be used in E-DCH, also called enhanced uplink (EUL). In this case, the user equipment is the transmitter and the base station is the receiver.

During a second TTI, a transmission over the HS-DSCH from a second user to a mobile terminal may use all of the bandwidth allotted to the HS-DSCH. During a third TTI, a transmission over the HS-DSCH from a third user to a mobile terminal may use all of the bandwidth allotted to the HS-DSCH and so forth. As used below, the term "user" corresponds to an entity seeking to transmit or receive information over a shared communications channel. In the non-limiting HS-DSCH example, the user corresponds to the the UE that is to receive information over the HS-DSCH.

Scheduling for the HS-DSCH is typically optimized for high throughput data transmission. In other words, the main goal for a HS-DSCH scheduler (in the past) is to maximize throughput for individual users, the entire cell, or the system. For example, a carrier-to-interference ratio (C/I) scheduler might try to maximize the system throughput by sending as much data as possible over the HS-DSCH to the user currently having the best C/I condition compared to those C/I's of the other active users. (The user's C/I corresponds to the radio transmission conditions from the base station to the intended mobile terminal.) This preferential treatment continues as long as that HS-DSCH user has packets in queue to be transmitted or until the radio conditions change and some other user is detected as having a better C/I condition. In that case, the scheduler starts sending data to the other user over the HS-DSCH.

Figure 1:
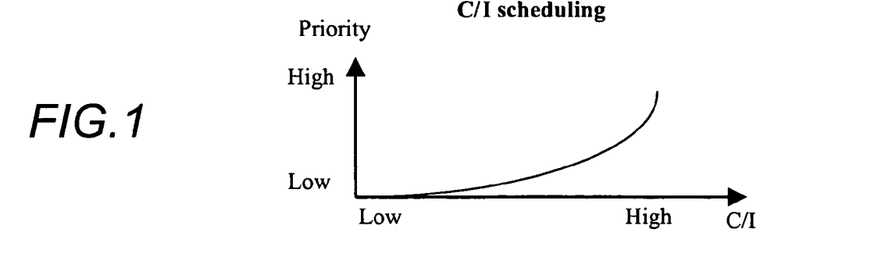
FIG. 1 is a graph illustrating C/I-based packet transmission scheduling.

Such preferential scheduling may be achieved by assigning a priority to user packet flows according to their respective C/I conditions. FIG. 1 conceptually illustrates packet transmission priority as a function of C/I for the HS-DSCH scheduler. The HS-DSCH scheduler compares the priorities for all packet flows and assigns transmission blocks to be transmitted in the next TTI on the HS-DSCH to the data packet flows with the highest priority. But a major drawback with this kind of priority scheduler is that mobile users with poor radio conditions are assigned a low priority and may be "starved out" so they are not allocated sufficient transmission blocks to provide acceptable service to that mobile user. Another drawback is that the throughput will vary substantially and often because the C/I radio conditions change over time.

Another scheduling approach could be proportional fair scheduling. A proportional fair scheduler tries to be fair to all mobile users by taking into account the average bit rate and the possible current bit rate for each mobile user. If the user has not been scheduled a transmission block over the HS-DSCH for a while, the mobile user's average bit rate will be low, and as a result, the user's priority will increase. With increased priority, the user's packets are transmitted over the HS-DSCH sooner. But users with poor channel conditions may still only receive relatively low throughput in contrast with mobile users with good channel conditions that continue to receive high throughput.

Both the C/I scheduling and proportional/fair scheduling also have serious drawbacks when it comes to scheduling packets for services that require predictable and stable transmission delay times. One example of such a service is Voice-over-IP (VoIP). Unlike data services such as email, file transfer, etc., where delaying the transmission and variability in the delay is tolerable, long delays and wide variances in delays in packet delivery are significant problems for VoIP and similar services. The transmitting VoIP application typically creates packets with a very regular interval, (e.g., every 20 msec), and the VoIP receiver should receive packets with a small delay jitter and a fairly constant packet transmission rate. Also, VoIP requires a small "delay jitter" independent of how radio transmission resources are allocated and scheduled for other mobile users. For purposes of this description, the term "delay jitter" describes the variability or range of packet transmission delay times attributable to priority decisions made by the packet transmission scheduler before a packet that is ready for transmission is actually transmitted. For both C/I scheduling and proportional/fair scheduling, the variations in throughput are quite unpredictable and depend on the priority assigned for other users.

Given these issues for VoIP and similarly constrained delay-sensitive services, another scheduling approach might be round-robin type scheduling where the time between each transmission is set equal for all users in a cell regardless of radio conditions in the scheduling decision. A round robin approach would likely even out the delay disparities between users, but delay jitter may still be a problem for all users if radio conditions change significantly and often.

Figure 2:
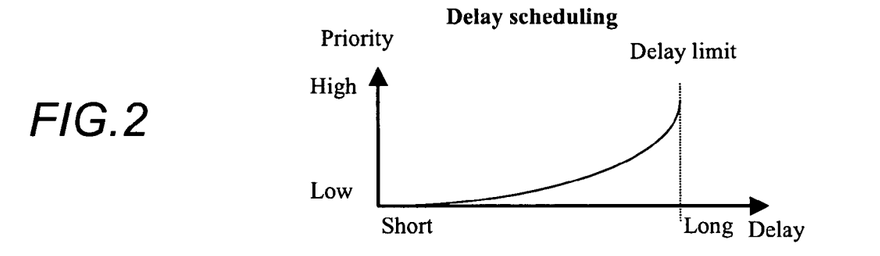
FIG. 2 is a graph illustrating delay-based packet transmission scheduling.

Yet another approach might be packet transmission delay scheduling where the packet priority is increased as a function of scheduling delay. Packets delayed a longer time receive higher priority. FIG. 2 illustrates the concept of delay scheduling—the longer the delay before transmission, the higher the priority. Delay jitter is decreased since packets with a longer delay get increased priority as shown in FIG. 2. Pure delay-based scheduling may work well if all mobile users are VoIP users, but it will likely provide less than optimal performance for mobile users that want high speed data transmission. To improve overall performance for pure data services, delay scheduling could be combined with either C/I scheduling or proportional/fair scheduling.

Figure 3:
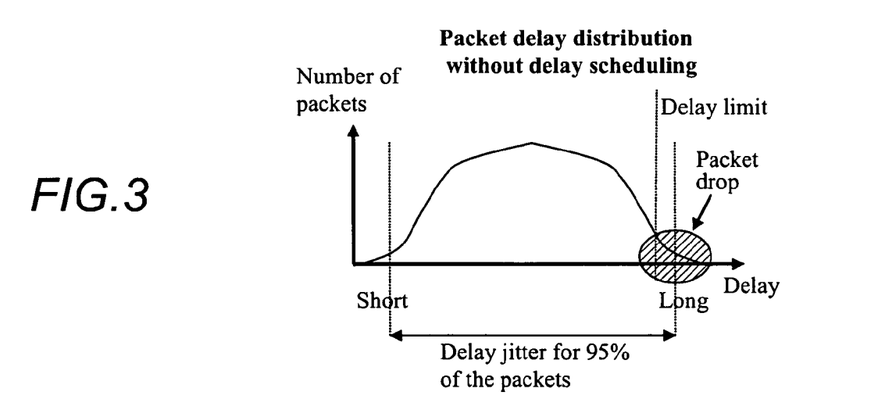
FIG. 3 is a graph that illustrates a packet delay distribution without delay-based packet transmission scheduling.
Figure 4:
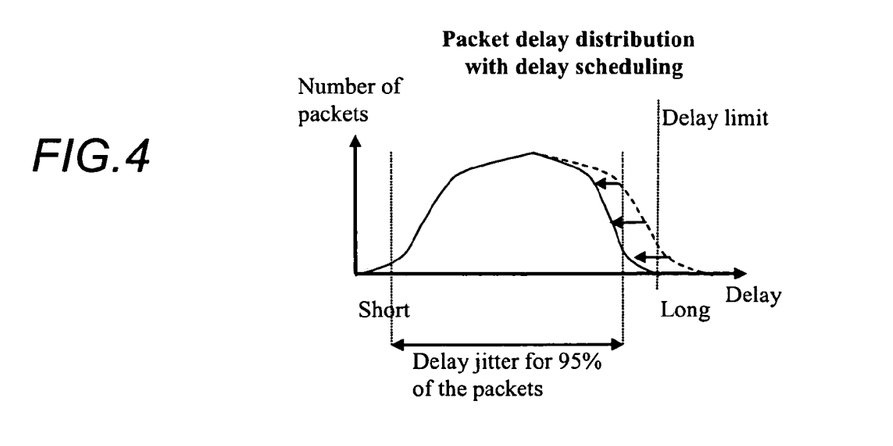
FIG. 4 is a graph that illustrates a packet delay distribution with delay-based packet transmission scheduling.

FIG. 3 graphs the number of packets transmitted versus scheduling delay to show an example of the delay distribution when a delay scheduling algorithm such as that described in conjunction with FIG. 2 is not used. The delay jitter or range is indicated taking into account 95% of the packets as an example. At the very longest delays beyond a delay limit, packets are dropped. FIG. 4 shows how using a delay scheduling algorithm reduces the delay jitter or the range of delays from the "high end" where the longest packet transmission delays are experienced. So the delay jitter is "compressed" from (or reduced at) the high end of the distribution curve. This high end compression moves the longest delayed packets within the delay limit so that no packets are lost.

Another factor that should be taken into account in packet scheduling is transport format (TF) selection. In WCDMA systems, high-speed data transmission is achieved by allocating a significant number of spreading codes (i.e., the radio resources in WCDMA systems) to the HS-DSCH. With small transport block (TB) sizes, few spreading codes are used each HS-DSCH TTI, and thus, the efficiency of the HS-DSCH is lower. From a packet transmission scheduling perspective, it is also inefficient to transmit small TB sizes each TTI. Another disadvantage with transmitting small TB sizes each TTI is that the padding (inserted "filler" bits) ratio for radio link control layer (RLC) packets combined into a TTI transmission block may be high depending on RLC packet size and voice codec packet sizes.

Accordingly, a packet transmission scheduling approach that overcomes these problems and resolves the above issues is needed to improve the performance and efficiency of shared channel transmissions for a broad range of services including time-delay sensitive services like VoIP, throughput-driven services like data services, etc.

SUMMARY

A packet scheduler reduces or compresses the delay jitter or delay range from the "low end" (the first part of the packet distribution curve shown in FIG. 4 where packets experience little or no scheduling delay). As a result, the number of packets that experience little or no delay is reduced. A preferred example way of compressing the delay jitter from the low end is to reduce the transmission priority of low delay packets. Compressing the delay jitter is particularly desirable for services like VoIP that require low delay jitter. In the context of a non-limiting example, a radio station (e.g., a base station) includes apparatus for use in scheduling packet transmissions over a channel. A transmission buffer buffers one or more packets associated with a first packet flow prior to transmission over the channel. A packet analyzer reduces a packet transmission delay jitter associated with transmitting packets from the transmission buffer. A packet scheduler schedules transmission of the one or more buffered packets in accordance with the reduced packet transmission delay jitter.

The packet analyzer analyzes the buffered packets to determine a first transmission priority for the one or more buffered packets and estimate a whether the one or more buffered packets will have a buffering delay less than a threshold delay.

If so, the packet analyzer increases the buffering delay for the one or more buffered packets. The packet scheduler then schedules transmission of the one or more buffered packets after expiration of the increased buffering delay.

The packet analyzer may be configured to increase the buffering delay in a variety of ways such as per packet, per flow of packets, or per group of packet flows. In a preferred implementation, the packet analyzer increases the buffering delay by reducing the first transmission priority for the one or more buffered packets. In that case, the packet scheduler schedules packet transmission from the buffer based on the reduced priority. As a result of the reduced priority, the one or more buffered packets with the reduced priority is stored in the buffer longer before being scheduled for transmission than the buffered packets would have been at the first transmission priority.

The buffering delay can be determined based on packet statistics. For example, if the one or more packets belong to a first packet flow, then the buffering delay may be estimated relative to a delay determined for packets in the first packet flow. Alternatively, if the packets belong to a first packet flow, the buffering delay may be estimated relative to a delay determined for packets in multiple packet flows. In addition, the packet analyzer may iteratively reduce the priority for the one or more buffered packets in increments.

Additional example embodiments may include increasing the priority of packets buffered longer that a predetermined buffering limit. This compresses the packet transmission delay range or jitter from both "ends". The packet analyzer may alternatively assign a zero or lowest priority to packets below the threshold delay. In that case, a packet combiner combines or "bundles" multiple packets from the buffer for inclusion in a transmission block. Still further packet analyzer may adapt the first transmission priority based on one or more of the following: channel condition, packet size, transmission buffer fullness, packet service priority, or subscription information associated with the first packet flow.

In the context of a radio base station, there will be multiple packet buffers. A priority memory may be used to store an associated transmission priority for each of the packet buffers. The packet analyzer then schedules packet transmissions for each buffer based on the associated transmission priority for each of the packet buffers. In a WCDMA system, the channel is a channel shared by multiple users, such as a high speed-downlink shared channel, and the one or more packets are Voice over IP packets.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 5:
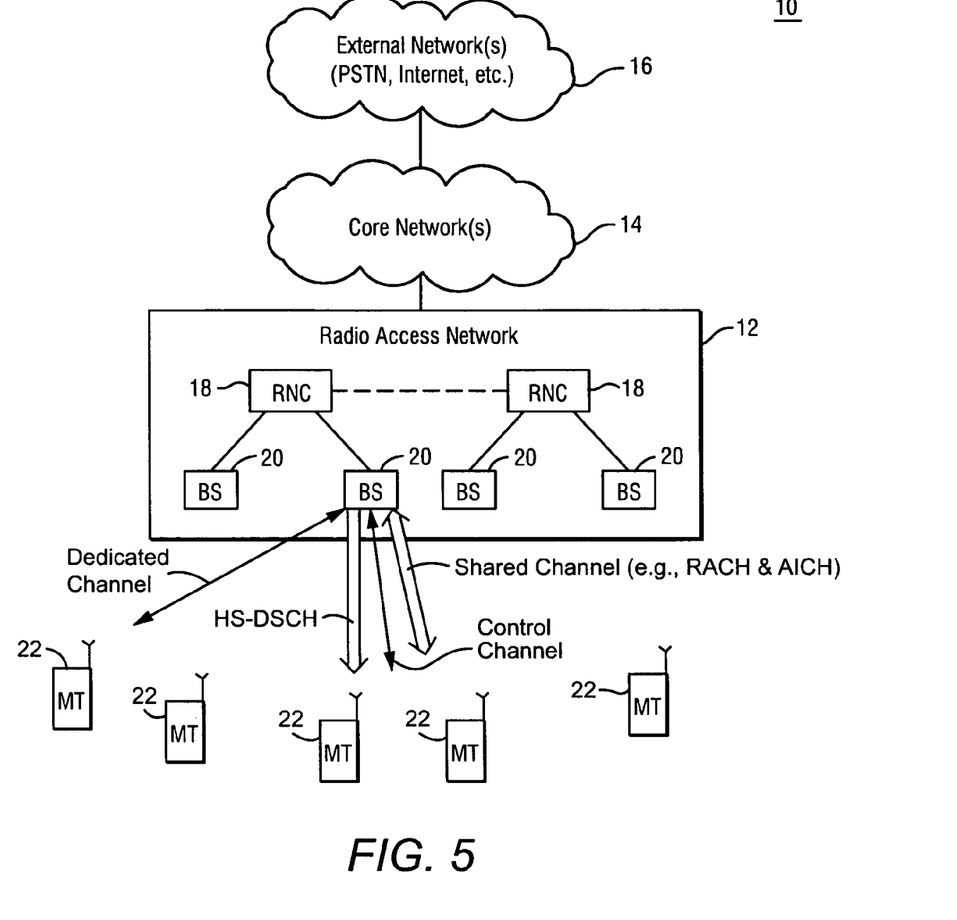
FIG. 5 is a high level drawing of a mobile communications network.

FIG. 5 illustrates an example representation of a mobile communications network 10. A radio access network (RAN) 12 is coupled to one or more core networks 14, which in turn, are coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Each base station 20 transmits information over an "air" interface in one or more corresponding coverage areas called cells over a variety of downlink radio channels. Each bases station 20 also receives uplink communications over the air interface from mobile terminals (22) in or near the base station's cell(s) again using one or more uplink channels. Mobile terminals are often referred to as mobile stations, mobile radios, and user equipment (UEs) and include, for example, cell phones, PDAs, laptop computers, and other wireless communication devices.

FIG. 5 conceptually represents different types of radio channels including one or more dedicated channels, one or more control channels, one or more broadcast channels, one or more shared channels like a RACH or AICH channel, and a high speed shared channel in the form of a high speed downlink shared channel (HS-DSCH). Although an HS-DSCH is used in the examples below, the invention is not limited to the HS-DSCH and can be used in any transmission situation where packets from different sources must prioritized and scheduled for transmission. For example, the invention applies to all channels that use a scheduler to select packet flow(s) or queue(s) from which the next packet(s) will be taken.

Figure 6:
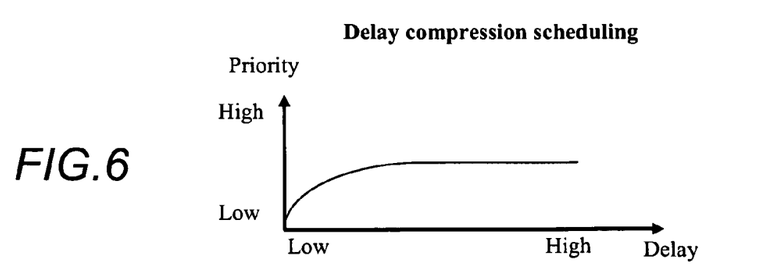
FIG. 6 is a graph illustrating delay compression packet transmission scheduling.

Delay compression scheduling is now described in conjunction with the graph in FIG. 6 which shows packet transmission scheduling priority as a function of packet transmission delay. Higher delayed packets receive a relatively constant higher priority. But as the packet delay decreases towards zero delay, the priority drops off with increasingly steeper slope. While the specific shape of the curve itself is not critical, it does illustrate that packets with little or no delay receive lower scheduling priority. As a result, the number of packets that receive an "unnecessarily" short delay is reduced. In addition, the delay jitter is compressed or reduced from the "low end" of the packet delay distribution curve which is particularly desirable for services that benefit from low delay jitter like VoIP.

Figure 7:
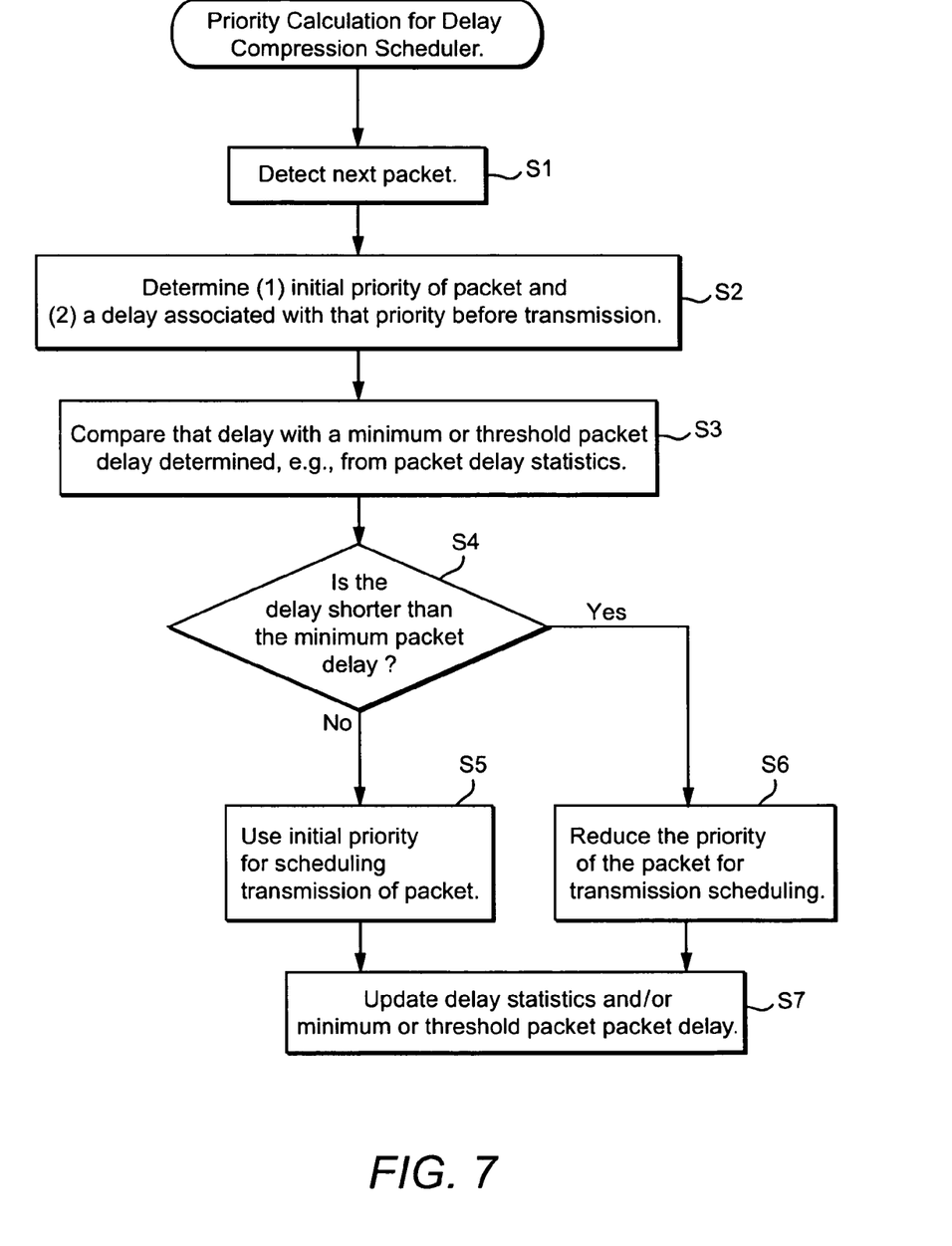
FIG. 7 is a flowchart illustrating example, non-limiting procedures for implementing delay compression scheduling.

One non-limiting example set of procedures for implementing packet transmission delay compression is now described in conjunction with the flow chart in FIG. 7. A next packet that is ready for transmission is detected (step S1). A processing entity determines an initial priority associated with the packet and the delay associated with this initial priority (e.g., the time the packet will have to wait in the transmit queue). In other words, the scheduling delay that will result from the packet having that priority is determined (step S2). A packet's priority may be determined for example by checking a priority field in the packet or by looking up the priority for that data in a priority table maintained in a memory. One example way to set initial packet priority is to set the initial priority to the same value for all packets within the same packet flow, e.g., priority 5 is assigned given a 10-point priority scale. If the inter-arrival time between the current packet and the preceding packet is smaller than the normal inter-arrival time, (e.g., less than 20 msec apart), then the initial priority may be set to some lower value, e.g., 3 or 4. The packet priority will then be increased for each time period that the current packet is not transmitted.

The current packet delay corresponds to the time a packet with this same priority has historically been buffered waiting for transmission and how much more time the packet will be buffered before transmission. The determined scheduling delay is compared to a predefined minimum delay or a threshold delay (step S3). However, the scheduling delay does not have to be compared with the minimum or threshold delay. Another example alternative is if the current packet would be delayed so little that the packet would be among those 10% of packets that are delayed the least, then its priority is decreased. The minimum or threshold delay may be determined from packet scheduling delay statistics. More specifically, each packet will be delayed some amount of time in the scheduling process. The scheduling delays for a number of packets are collected and stored. One example way to store packet scheduling delay statistics is to store a histogram where the scheduling delays are divided into a number of "bins." The collected statistics may then show, for example, that 10% of the packets are delayed 0-25 msec, 40% of the packets are delayed 25-50 msec, 30% of the packets are delayed 50-75 msec, and 20% of the packets are delayed 75 msec or more. Another example way to store the statistics is to calculate and store parameters, for example, the average and variance of the packet scheduling delay. The scheduling delays can either be collected for the packets in one stream (for example one phone call) or can be collected for a group of calls (or all calls).

A non-limiting and example packet scheduling delay statistic, i.e., the time packets are delayed in the scheduler, includes an estimate of how much scheduling delay this packet will experience based on the delay previous packets with the same priority experienced before being transmitted. If previous packets with the same priority were, for example, scheduled for transmission with a 80-120 msec delay, then delaying current/future packets within the same packet flow with only a 20-40 msec scheduling delay is a waste of resources if another user with more data to transmit is waiting.

Gathering packet scheduling delay statistics can be very useful for future packet transmission scheduling. Indeed, scheduling delays will vary depending on how much data other users are transmitting and the radio conditions for the users (not only for the current user but for all users). If most other users are silent (e.g., in discontinuous transmission (DTX)) then there will be many free TTIs for the current user, and the packet delay will be quite short. But if most other users are active (e.g., are talking), then all users will have to share the TTI resources. In addition, some users will also have bad radio coverage and will require packet retransmissions. Still further, radio conditions vary over time. As a result, the number of TTIs that are available for current users also varies over time. Hence, the statistics can be quite helpful in scheduling decisions.

[Another useful statistic is packet inter-arrival times. Preferably then, although not necessarily, an inter-arrival time of incoming packets to the transmission buffer is taken into account. The speech encoder generates VoIP packets at a fixed rate or with a fixed interval, for example, one packet every 20 msec. The VoIP packets are then received at the scheduler with some time difference, which is the inter-arrival time. If packet N arrives at, for example, 100 msec, and packet N+1 arrives after 105 msec, then the inter-arrival time is 5 msec, i.e., 15 msec earlier than expected. The system knows that these packets belong to a VoIP flow and that the inter-arrival time should normally be 20 msec. If the first packet (N) was transmitted as soon as possible, it may be a waste of resources to send the second packet (N+1) also as soon as possible, i.e., only 5 msec after the first packet. The scheduler can therefore "hold" the second packet for 10-15 msec and use the intervening TTIs for some other user instead.

Returning to the flowchart, the comparison in step S3 permits a determination whether the determined delay is shorter than it needs to be (step S4). If a packet with a particular initial priority would lead to a delay that is less than the statistical delay value for the other packets within the same packet flow, then the delay of that packet is preferably increased by decreasing the priority of the packet (step S 5). Other delay increase mechanisms could be used. For example, rather than using an indirect delay increase mechanism like decreasing priority, the delay itself could be directly increased. A lower priority means higher priority packets on other user VoIP flows will be transmitted first, thereby increasing the delay time the packet experiences in scheduling transmission. But if the delay comparison reveals that the packet's forecasted delay is not too short as compared to a minimum or threshold packet transmission delay, then the priority for the packet remains unchanged. Preferably, the delay statistics and/or the minimum or threshold delay value are updated (step S7). This delay compression process may then be performed for the next packet received for this packet flow or currently stored in a packet transmission buffer. If the priority is reduced in small increments, then the delay compression process in FIG. 7 can be performed multiple times per packet, packet flow, or group of packet flows.

Figure 8:
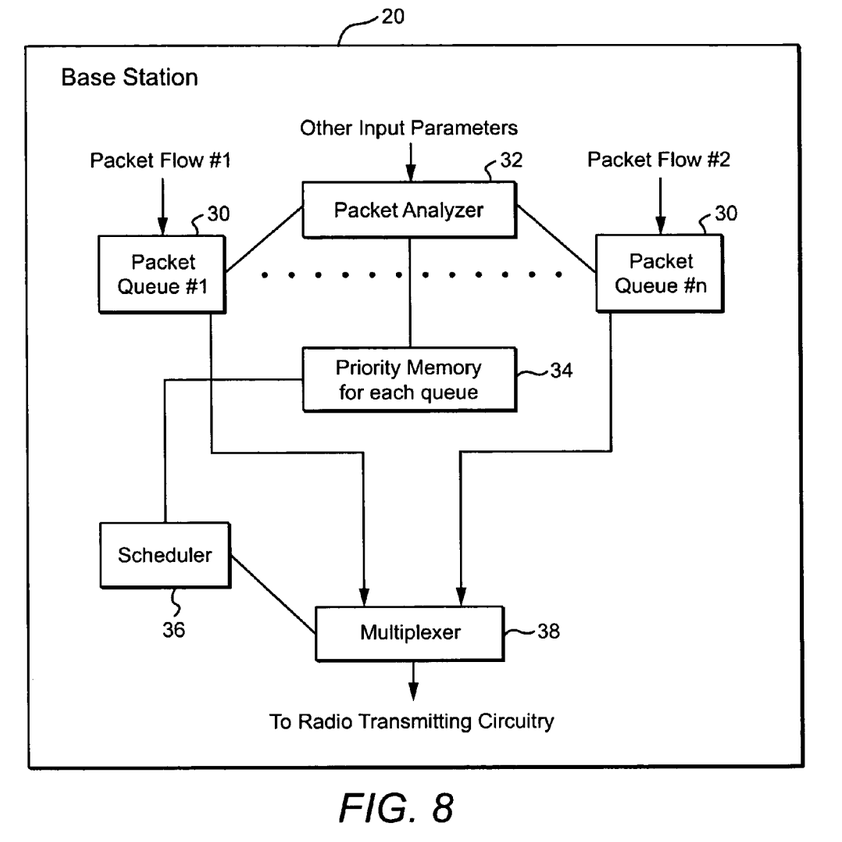
FIG. 8 is a simplified function block diagram of a base station that may be used to implement delay compression scheduling.

FIG. 8 illustrates a non-limiting example way in which the packet transmission delay compression procedures in FIG. 7 may be implemented in a base station 20 in the example communications system 10 shown in FIG. 5. Incoming packets are stored in an associated packet transmission buffer or queue 30 (queue #1, ..., queue #n). One packet queue may be maintained per flow per user, but other queuing implementations are possible. For example, several flows may share one queue. A packet analyzer 32 determines a per-packet queuing delay for the packet(s) that are in each queue 30 (the packet analyzer 32 may determine the delay(s) of one or several packets in the queue 30). The per-packet queuing delay may be determined by finding the difference between the time when a packet enters the queue 30 and the time when the packet is removed from the queue for transmission. The packet analyzer 32 also determines the queue's priority based on the priority of the packets stored in the queue 30. The analyzer 32 stores the calculated priority in a priority memory 34 that maintains priorities for each queue 30. Priority may also be associated per flow or per queue rather than per packet. For example, only one priority value may be stored per queue corresponding to the priority of the "oldest" packet in the queue. Although implementation dependent, for a scheme where priority is associated with individual packets, the scheduler might only detect the priority of the oldest packet, compare this priority value with the priorities of the oldest packet for the other flows, and then choose from which queue(s) to take packet(s) for the next TTI.

A packet transmission scheduler 36 determines when to transmit packets from a particular packet queue 30 based on the priority stored for that queue in the priority memory 34. The scheduler 36 selects higher priority queue(s) before lower priority queue(s) by sending appropriate control signals to a multiplexer 38 coupled to the packet queues 38. The multiplexer 38 combines the selected highest priority packet queue(s) and sends the packet stream to the radio transmission circuitry in the base station 20.

The packet analyzer 32 determines a minimum or threshold packet transmission delay using, for example, delay statistics that it determines as explained above (or that it has provided to it). Of course, other methods may be used to establish a minimum or threshold packet transmission delay including using a preset value. Based on that comparison, the packet analyzer 32 determines whether the priority of the packet queue 30 should be decreased. If so, the packet analyzer 32 decreases the packet priority level in the priority memory 34 for the packet queue 30. Decreasing the packet's priority level causes the transmission delay for that packet to increase.

The packet analyzer 32 may combine the packet delay with one or more other input parameters to determine packet and/or queue priority. Example other input parameters include a channel quality indication, packet size, queue fullness level (how many packets there are in the queue), service priority, (e.g., telephony typically has higher priority than file transfer), and/or subscription information (some users may have a "high quality" subscription while others have a "low cost" subscription). The packet analyzer 32 may also determine priorities separately for the packet delay information and for one or more additional input parameters and then combine those priorities to form one priority value.

Figure 9:
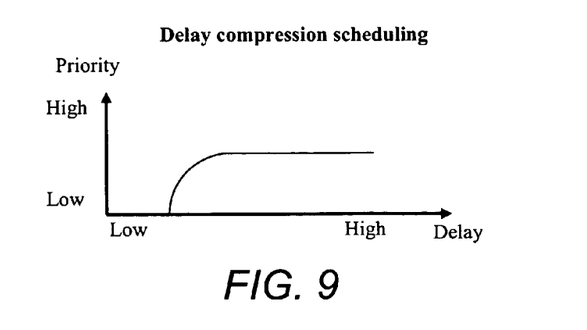
FIG. 9 is a graph illustrating bundled delay compression packet transmission scheduling.

Another non-limiting example implementation for packet delay compression scheduling is described in conjunction with FIG. 9. Packets with zero or low delay receive a zero priority which forces "packet bundling." Packet bundling describes combining smaller packets together for transmission in a larger transmission block. Consider a VoIP example. Moving down the packet protocol stack from the network layer, each VoIP packet is encapsulated in one RLC transmission block, and each RLC block is encapsulated in one MAC-d transmission block. One or several MAC-d transmission blocks may be bundled into one MAC-hs transmission block.

The number of MAC-d blocks bundled depends on the current HS-DSCH channel quality. An ACK/NACK message from the mobile terminal receiver contains a Channel Quality Indicator (CQI) that identifies the HS-DSCH channel quality. The CQI information from previously-received ACK/NACK messages from a receiving mobile terminal is used to predict how much redundancy (transmission power, robust modulation, and channel coding) is needed for the next transmission block in order to meet a certain block error target rate. The remaining bits can then be used for user data. If the channel is good, then only a small amount of redundancy is needed so that substantial amounts of user data can be sent in a transmission block. Several MAC-d transmission blocks can then be bundled into the one MAC-hs transmission block. Since VoIP packets are relatively small (e.g., a few 100 bits), and a MAC-hs transmission block can be large (e.g., up to 10-20 kbit depending on the selected modulation), it is possible to send a substantial number of VoIP packets in each MAC-hs transmission block. But if the channel quality is bad, then a more robust modulation scheme must be used, which gives a lower "raw" bit rate, and as well as significantly more channel coding than for good channel quality. The result is a much smaller MAC-hs block size so that only one or a few VoIP packets can be packed into each MAC-hs transmission block.

For data services and situations where there is a large amount of data in the transmission queue, the transmitter tries to maximize the size of MAC-hs blocks and increase the transmission power in order to meet a predefined block error rate target. If the channel conditions are poor and the transmitter cannot increase the power any further, (i.e., there is an upper limit on the transmission power), then the transmitter switches to a more robust coding scheme resulting in packets being transmitted from the transmission queue at a reduced rate.

For VoIP service, since the packets are few and since the bit rate is quite small (compared to data services), the transmitter will likely empty the queue (for that user) every time the user is scheduled for transmission. If there are fewer bits to transmit than what the channel can handle, then the transmitter chooses a lower rate modulation scheme (and/or less channel coding) and reduces the transmission power in order to cause as little interference as possible.

In this "bundling" embodiment, this bundling knowledge is combined with delay compression scheduling. The scheduler 36 decides which user (or which N users) will use the next HS-DSCH transmission block. For example, the 3GPP specification allows combining data from up to 15 users in each transmission block. So if there are 100 users, then all the other 85 users must wait for the next TTI interval.

Depending on how much time a specific user must wait before being scheduled, there may be one or several user packets in the transmission queue. If the user was scheduled quite recently, it is likely that the user's queue contains only 1 or 2 packets. If the waiting time was longer, for example 100 msec, then it is likely that there are 4-5 packets in the user's queue. In any event, the transmitter will transmit as many packets as possible from the queue, depending on how much data the channel quality allows. This means that a transport block (TB) will be larger with packet transmission delay compression scheduling than without. Also, the delay compression scheduling may avoid unnecessary padding, (depending on the available RLC PDU size and voice codec packet sizes), by forcing packet bundling in the scheduler 36.

The delay compression priority function may be combined with other priority functions. For example, the delay compression priority function may be combined with the delay scheduling function illustrated in FIG. 2. The result is illustrated in the graph shown in FIG. 10. In this approach, zero or very low delay packets receive very low priority, and packets with long delays receive very high priority. This approach compresses the delay jitter from both the high and low ends resulting in a smaller delay jitter.

Figure 10:
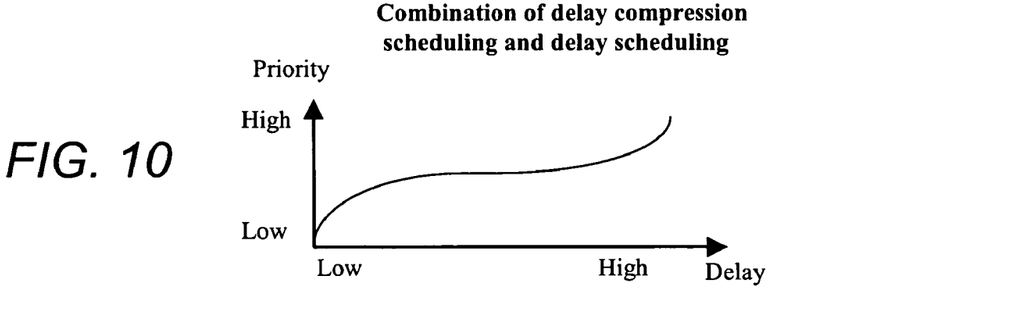
FIG. 10 is a graph illustrating another non-limiting implementation of delay compression packet transmission scheduling that incorporates delay scheduling like that shown for example in FIG. 2.
Figure 11:
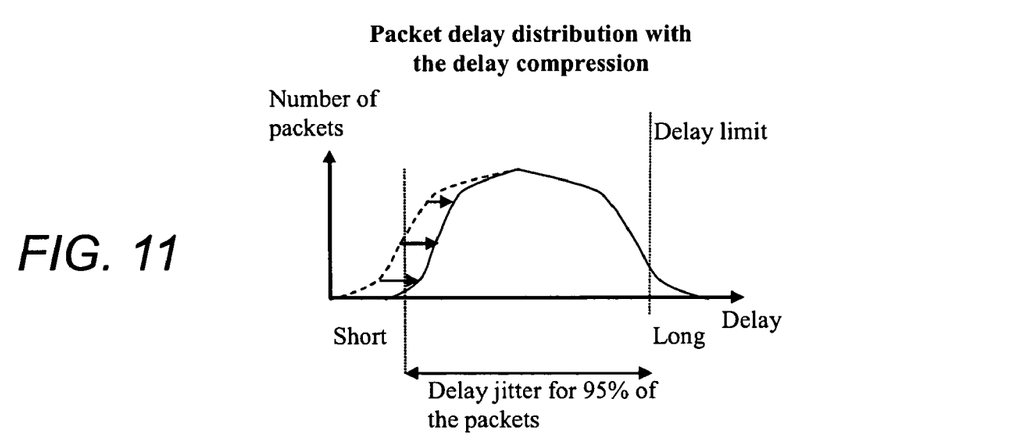
FIG. 11 is a graph that illustrates a packet delay distribution with delay compression packet transmission scheduling.

The delay distribution that may be achieved with a packet transmission delay compression scheduler (following for example the priority curve in FIG. 6) is shown in FIG. 10 which shows the delay jitter or range is reduced from the "low end." The packet transmission delay distribution is even more compressed compared to the distribution in FIG. 4 if both delay compression and delay scheduling (see the example priority curve in FIG. 11) are used. This approach achieves even greater reductions in packet transmission delay jitter than using only delay scheduling.

Other Considerations

For delay compression scheduling, the packet analyzer determines whether a packet at the transmission queue will likely have a low or no packet transmission delay. As explained above, the packet analyzer does this by collecting delay statistics (delay distribution) for many prior packets from that queue and determining that the current packet in the queue has a low delay compared to the other packets. The delay statistics may be based on the packets for the current flow which means that separate distribution functions would need to be stored in memory for separate packet flows. This may potentially require quite a lot of storage capacity since there may be many active flows.

An alternative to reduce the memory requirements and simplify the delay determination process is to only collect delay statistics for all flows combined. That way only one common delay distribution function need be stored. But the tradeoff is less accurate decisions since the flows may have quite different characteristics and requirements with respect to scheduling delay depending on the type of data being transmitted in each respective flow. A compromise between accuracy and storage requirements is to aggregate statistics for flows that have similar characteristics.

Figure 12:
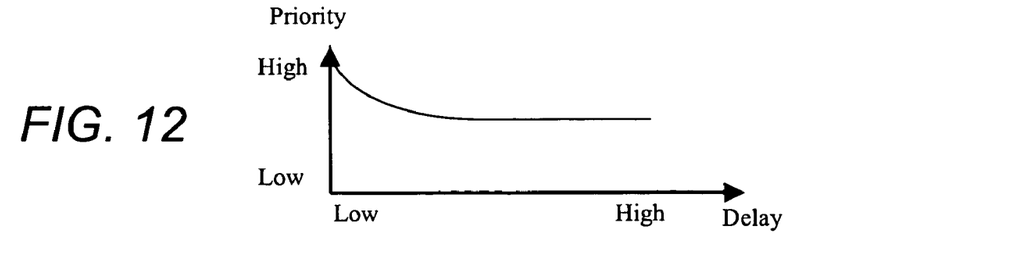
FIG. 12 is a graph of priority versus delay that shows an example of delay compression during poor radio conditions.

Another consideration is radio channel conditions. Delay compression scheduling increases the probability of packet bundling which can be very advantageous in satisfactory to excellent radio conditions as described above. However, in poor radio conditions, the probability of errors increases significantly. This situation is particularly troublesome with bundling. Bundling means that the probability of transmitting a packet successfully as part of a multi-packet transmission block decreases with an increasing number of packets in that block which are transmitted simultaneously during one TTI. Therefore, another example embodiment of the delay compression algorithm adapts packet priority to account for different channel conditions. For example, when a C/I ratio is below a predefined threshold, the priority for low delay packets can be increased rather than decreased. One example is illustrated in FIG. 12. Although this variation may increase the delay jitter, it may be more important to maintain a fairly constant packet rate to be able to keep the connection up and running. Moreover, it is also important to avoid too many consecutive packet losses which might occur if the channel conditions are bad and several packets are bundled into the same transmission block that is corrupted because of those poor channel conditions.

Advantages with Delay Compression Scheduling

Delay compression for packet transmission offers many advantages. First, reducing the delay jitter range means that delay sensitive services like VoIP can be provided with better results. Second, smaller delay jitter means that a smaller jitter buffer is needed.

Third, transmission resources can be better utilized. Each layer in the protocol stack (IP, RLC, MAC-d, MAC-hs) adds a header which translates to overhead. Packet transmission delay compression scheduling promotes packet bundling into transmission blocks. Sending more packets per block reduces the impact of the header overhead. Similarly, if more MAC-d transmission blocks can be bundled to fill up most of a MAC-hs transmission block, then less padding will be needed to "fill up" the MAC-hs block, and the padding overhead can be "spread out" over several packets.

Fourth, the priority assignment for one packet flow may be made independently of the priority assignment for other packet flows. The priority assignment function can thus be separated from the scheduling function that compares the priorities for different packet flows and determines what packet flow to schedule for transmission.

Fifth, packet transmission delay compression scheduling is adaptive. Packet priorities need only be modified when there is a benefit from the priority reallocation. The packet transmission delay compression scheduler reallocates priority only when there are packet flows that can sacrifice radio resources and there are packet flows that can benefit from those resources made available. If there are only packet flows with low delay, then no resources will be reallocated and all flows will maintain their respective delays. Similarly, if there are only flows with long delay, then the priorities will remain unchanged since there are no flows that can give away resources.

Sixth, the delay variations between different flows are reduced, both for flows within the same cell and for flows in different cells. With big variations, for example due to variations in system load, it is difficult to determine what impact a change in one cell can have on the performance in the surrounding cells. The impact is especially hard to analyze because performance in a cell is usually a non-linear function of the cell load. And if different cells operate on different points on the non-linear function, then it is difficult to analyze what the overall system gain will be when a modification is made. By making flows in the cells behave more similarly, it is easier to predict and/or analyze the effects of changes in parameter settings.

Seventh, in cases where the packet transmission delay statistics are aggregated for several flows, packet transmission delay compression scheduling also makes different packet flows behave more similarly, the aggregated statistics being more accurate.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for use in scheduling packet transmissions over a channel that reduces transmission delay jitter corresponding to a range of packet transmission delay times attributable to individual packet priority decisions made before a packet that is ready for transmission is actually transmitted, comprising:
   buffering one or more packets associated with a first packet flow prior to transmission over the channel;
   for each buffered packet:
      determining a transmission priority for the buffered packet;
      estimating, based on the determined transmission priority for the buffered packet, whether that buffered packet will have a buffering delay less than a threshold delay;
      if so, increasing the buffering delay for that buffered packet to compress the range of packet transmission delay times attributable to individual packet priority decisions by reducing the transmission priority for the buffered packet; and
      scheduling transmission of that buffered packet based on the increased buffering delay so that the buffered packet is buffered longer before being scheduled for transmission than the buffered packet would have been buffered at the transmission priority thereby compressing the range of packet transmission delay times attributable to individual packet priority decisions.

2. The method in claim 1, wherein the buffering delay is increased per packet, per flow of packets, or per group of packet flows.

3. The method in claim 1, wherein the transmission scheduling is based on the reduced priority.

4. The method in claim 3, wherein the buffering delay is determined based on packet statistics.

5. The method in claim 4, wherein the one or more packets belong to a first packet flow, and wherein the buffering delay is estimated relative to a delay determined for packets in the first packet flow.

6. The method in claim 4, wherein the buffering delay is estimated relative to a delay determined for packets in multiple packet flows.

7. The method in claim 3, wherein the priority for the one or more buffered packets is iteratively reduced in increments.

8. The method in claim 3, further comprising:
   increasing the priority of packets that have been buffered longer than a predetermined buffering time.

9. The method in claim 3, further comprising:
   assigning a zero or lowest priority to packets below the threshold delay.

10. The method in claim 3, further comprising:
    adapting the transmission priority based on one or more of the following:
    channel condition, packet size, transmission buffer fullness, packet service priority, or subscription information associated with the first packet flow.

11. The method in claim 1, wherein the channel is a channel shared by multiple users, such as a high speed-downlink shared channel, and the one or more packets are Voice over IP packets.

12. The method in claim 1 applied to multiple packet flows.

13. Apparatus for use in scheduling packet transmissions over a channel that reduces transmission delay jitter corresponding to a range of packet transmission delay times attributable to individual packet priority decisions made before a packet that is ready for transmission is actually transmitted, comprising:
    a transmission buffer for buffering one or more packets associated with a first packet flow prior to transmission over the channel;
    a packet analyzer processor configured to:
       determine a first transmission priority for each buffered packet;
       estimate, based on the determined first transmission priority for the buffered packet, whether that buffered packet will have a buffering delay less than a threshold delay;
       if so, increase the buffering delay for that buffered packet to compress the range of packet transmission delay times attributable to individual packet priority decisions by reducing the first transmission priority for the buffered packet; and a packet scheduler processor configured to schedule transmission of that buffered packet based on the increased buffering delay so that the buffered packet is buffered longer before being scheduled for transmission than the buffered packet would have been buffered at the first transmission priority thereby compressing the range of packet transmission delay times attributable to individual packet priority decisions made by the packet transmission scheduler processor.

14. The apparatus in claim 13 configured to schedule packet transmissions for multiple packet flows.

15. The apparatus in claim 13, wherein the packet analyzer processor is configured to increase the buffering delay per packet, per flow of packets, or per group of packet flows.

16. The apparatus in claim 13, wherein the packet analyzer processor is configured to schedule packet transmission from the buffer based on the reduced priority.

17. The apparatus in claim 16, wherein the packet analyzer processor is configured to determine the buffering delay based on packet statistics.

18. The apparatus in claim 17, wherein the one or more packets belong to a first packet flow, and wherein the packet analyzer processor is configured to estimate the buffering delay relative to a delay determined for packets in the first packet flow.

19. The apparatus in claim 17, wherein the one or more packets belong to a first packet flow, and wherein the packet analyzer processor is configured to estimate the buffering delay relative to a delay determined for packets in multiple packet flows.

20. The apparatus in claim 16, wherein the packet analyzer processor is configured to iteratively reduce the priority for the one or more buffered packets in increments.

21. The apparatus in claim 16, wherein the packet analyzer processor is configured to increase the priority of packets that have been buffered longer than a predetermined buffering time.

22. The apparatus in claim 16, wherein the packet analyzer processor is configured to assign a zero or lowest priority to packets below the threshold delay, further comprising:
a packet combining processor for combining multiple packets from the buffer for inclusion in a transmission block.

23. The apparatus in claim 16, wherein the packet analyzer processor is configured to adapt the first transmission priority based on one or more of the following: channel condition, packet size, transmission buffer fullness, packet service priority, or subscription information associated with the first packet flow.

24. The apparatus in claim 13, further comprising:
multiple packet buffers, and
a priority memory for storing an associated transmission priority for each of the packet buffers,
wherein the packet analyzer processor is configured to schedule packet transmissions for each buffer based on the associated transmission priority for each of the packet buffers.

25. The apparatus in claim 13, wherein the channel is a channel shared by multiple users, such as a high speed-downlink shared channel, and the one or more packets are Voice over IP packets.

26. Apparatus for use in scheduling packet transmissions over a channel that reduces transmission delay jitter corresponding to a range of packet transmission delay times attributable to individual packet priority decisions made before a packet that is ready for transmission is actually transmitted, comprising:
a transmission buffer for buffering multiple packets associated with a first user packet flow prior to transmission over the channel;
a packet analyzer circuitry configured to:
determine a transmission priority for each buffered packet associated with the first user packet flow depending on how long the packet remains in the buffer;
reduce the range of packet transmission delay times attributable to individual packet priority decisions associated with transmitting packets from the transmission buffer by reducing the transmission priority for at least one of the buffered packets associated with a first user packet flow multiple times as the at least one of the buffered packets remains in the transmission buffer, while maintaining the priority of another of the buffered packets associated with a first user packet flow;
a packet transmission scheduler circuitry configured to schedule transmission of the at least one of the buffered packets in accordance with the reduced transmission priority and to schedule transmission of the another of the buffered packets in accordance with the determined transmission priority for the another of the buffered packets thereby reducing the range of packet transmission delay times attributable to individual packet priority decisions.

27. The apparatus in claim 26, wherein the packet transmission scheduler circuitry is configured to schedule packet transmission from the buffer based on the reduced priority.

28. The apparatus in claim 26, wherein the channel is a channel shared by multiple users, such as a high speed-downlink shared channel, and the one or more packets are Voice over IP packets.

* * * * *